June 24, 1941.  R. C. TOWNSEND  2,246,609
VEHICLE TRUCK ASSEMBLY
Filed Oct. 27, 1939  3 Sheets-Sheet 1
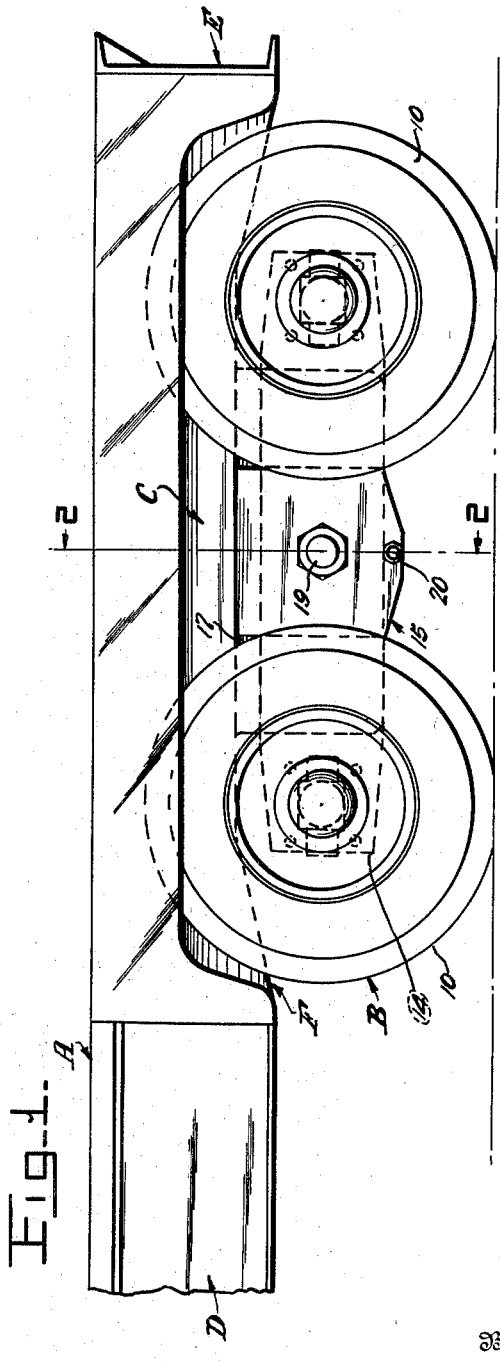
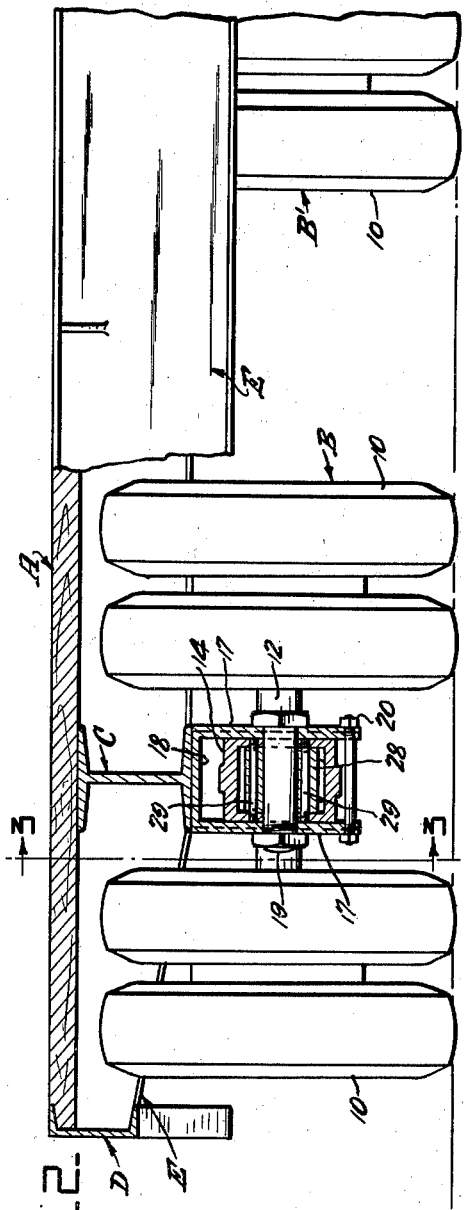
Inventor
ROY C. TOWNSEND
By Carlsen & Hoyle
Attorneys

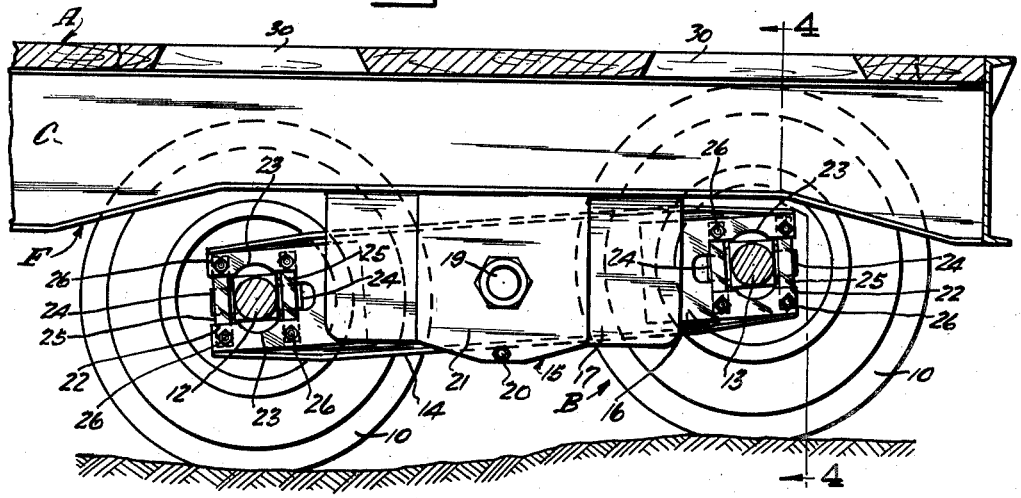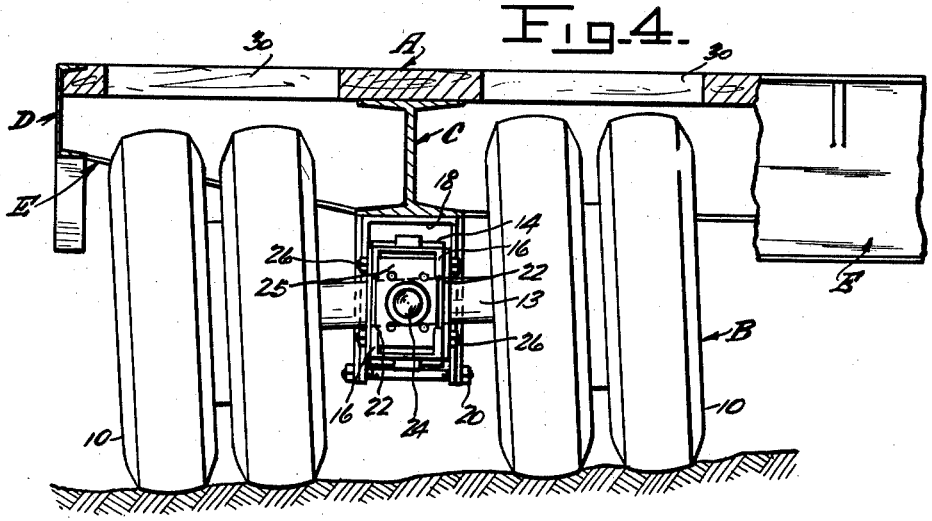

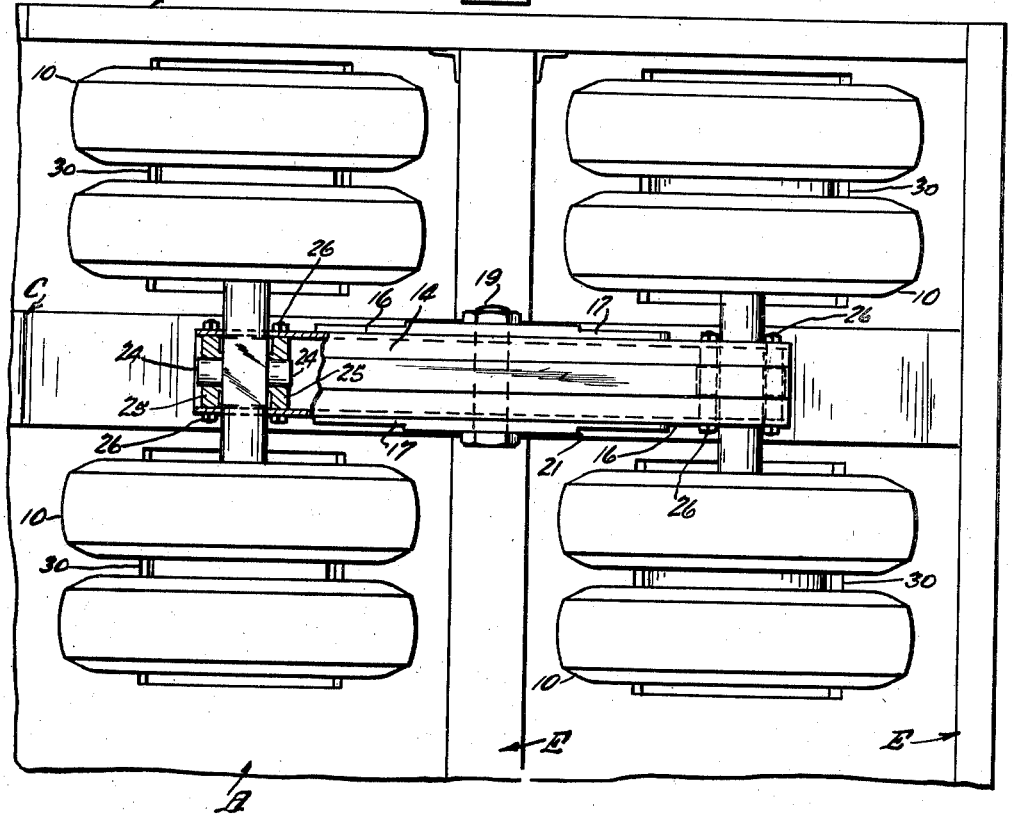
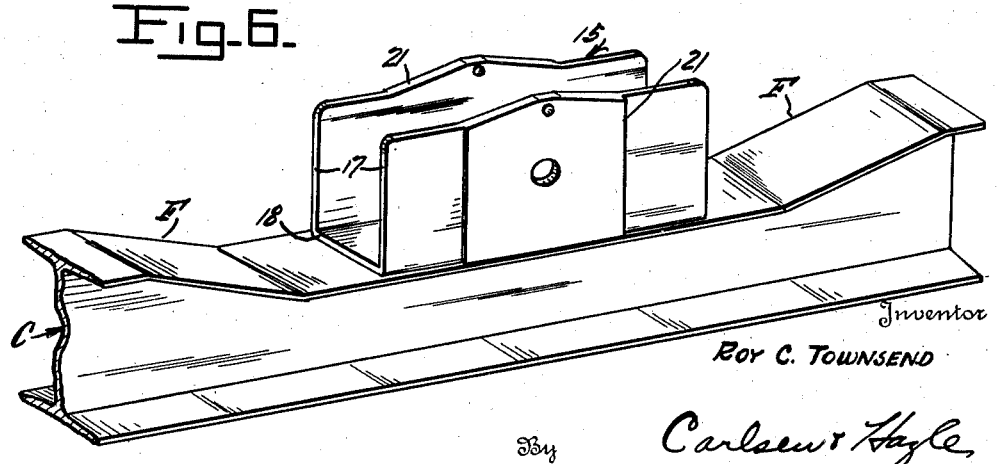

Patented June 24, 1941

2,246,609

UNITED STATES PATENT OFFICE 2,246,609

VEHICLE TRUCK ASSEMBLY

Roy C. Townsend, La Crosse, Wis.

Application October 27, 1939, Serial No. 301,612

6 Claims. (Cl. 280—81)

This invention relates to truck units for such heavy duty vehicles as large trailers used for transporting heavy machinery and the like.

In the transportation of such extremely heavy loads as is accomplished by the larger sizes of trailers it is important that the load be distributed to the road surface over as large an area as possible in order thus to prevent injury to the road. It is customary therefore to provide such vehicles with a plurality of wheels arranged in sets or trucks. It is the purpose of the present invention to improve the construction of such trucks so that the load stresses will be distributed equally to all of the wheels associated with the trucks and so that the wheels are allowed freedom of vertical movement such that they may follow road surface irregularities and maintain constant bearing engagement therewith.

The primary object of the invention is to provide an improved truck assembly in which the various pivot axes supporting the wheels, for their load compensating, oscillating movement, are arranged all in a substantially common horizontal plane to thus facilitate brake connection to the wheels, reduce the space beneath the trailer necessary for the oscillating action and facilitate the proper load distribution to the wheel axles.

Another and important object is to provide, for a truck assembly of this kind wherein front and rear wheels are connected to an oscillating bolster member, a mounting affording wide lateral bearing surfaces for the bolster member to thereby hold said member against any misalignment due to transverse or steering stresses set up on the front and rear wheels.

These and other more detailed and specific objects will be disclosed in the course of the following specification, reference being had to the accompanying drawings, in which—

Fig. 1 is a side elevation of the rear portion of a trailer vehicle showing one truck assembly constructed in accordance with my invention, the wheels being shown as running on a perfectly even road surface.

Fig. 2 is a vertical transverse section along the line 2—2 in Fig. 1, a rear fragmentary portion of the vehicle being shown in elevation.

Fig. 3 is a fragmentary longitudinal vertical section along the line 3—3 in Fig. 2, in this case showing the wheels running on an irregular road surface to illustrate the longitudinal oscillating movement of the truck.

Fig. 4 is a vertical transverse section along the line 4—4 in Fig. 3, but showing the wheels oscillated in a transverse vertical plane to compensate for a different road surface irregularity.

Fig. 5 is a bottom or inverted plan view of the rear side portion of a vehicle showing my truck assembly thereon, and with a portion broken away and in section to better show the construction.

Fig. 6 is a perspective view of one main beam of the vehicle, in an inverted position, and showing the bolster mounting member thereon.

Referring more particularly to the drawings, my invention is shown therein as applied to a trailer type of vehicle although it may be used as well with other types and kinds of vehicles as may be desired. Only a rear, side portion of the trailer is shown, but it will be understood that the trailer is the usual type having the substantially rectangular platform A supported at the frontal end by a steerable truck (not shown) and at the rear end by two (or more) of my improved truck assemblies, one of which is designated generally at B, and the other of which, appearing fragmentally in Fig. 2, is designated B'. The frame is made up by parallel longitudinal beams, one of which is shown at C, outer or side channels, one of which is shown at D, and a series of cross members E, all secured together in accordance with usual practice.

One truck assembly B is arranged beneath each of the beams C and secured thereto so that load stresses will be transmitted evenly to the trucks. In order to reduce the height of the platform, and thus facilitate loading and unloading operations, the beams C may be reduced in width vertically at their rear end portions over the trucks as designated at F.

In the present instance the truck B (and of course the truck B') is shown to comprise four wheels 10, each having double tires, which wheels are arranged in front and rear pairs upon the ends of the front and rear tandem axles 12 and 13 disposed at the ends of a longitudinal bolster or supporting members 14. This bolster 14 is extended parallel with the beam C beneath its narrowed portion F and is connected thereto by the bolster mounting and guide member 15 in such manner of course that the weight of the trailer and load will be transmitted through the bolster to the several wheels 10.

The bolster is of elongated tubular form and of rectangular cross section to thus provide spaced vertical sides 16, and the mounting member 15 takes the form of transversely spaced vertical, longitudinal flanges 17 which embrace and engage these bolster sides to permit complete freedom of vertical movement of the bolster while positively preventing any horizontal or transverse displacement. The flanges 17 may be conveniently formed as the sides of a channel or U-shaped piece having its bight 18 welded or otherwise secured to the underside of the beam C so that the flanges depend rigidly from the beam and define a channel for the reception of the bolster.

A supporting bolt 19 is extended centrally through the flanges 17 and bolster sides 16 in a horizontal transverse plane and it will be evident, therefore, that the bolster may oscillate freely in the vertical plane at its opposite front and rear ends to thus allow the wheels 10 to adjust themselves to irregularities in the road surface in the manner shown in Fig. 3. The flanges 7 are prevented from any possible spreading by one or more cross bolts 20 extended between lower edges of the flanges clear of the bolster. The center portions of the flanges may also be reinforced by building them out to a greater thickness or welding on side plates as shown at 21. The center of the bolster carries a bushing member 28 through which the bolt 19 passes and which is retained in place between the bolster sides by pins 29.

At their ends the bolster sides 16 are slotted inwardly in transverse alignment as indicated at 22 and the front and rear axles 12 and 13 pass through these slots with freedom for vertical oscillating movements of the axles relative to the bolster. The slots 22 are enlarged as shown at 23 for this purpose, but the width of the slots is also such that the axles may be withdrawn out through the ends of the slots when necessary in servicing the truck or tires. The axles each have opposite, forwardly and rearwardly extended and horizontally axised trunnions or arbors 24 at their centers and apertured bearings or bearing blocks 25 are seated in the bolster in spaced relation to pivotally receive said trunnions, the said blocks being inserted endwise into the bolster and secured in proper spaced relation by cross bolts 26 which pass through the sides of the bolster. These trunnions thus define horizontal axes, at right angles to the axis on which the bolster rocks, upon which the individual front and rear wheels may oscillate in vertical planes to thus allow the wheels to follow the contour of the road surface when it is irregular transversely to the line of travel, as clearly shown in Fig. 4.

The platform A, if necessary, may be provided with openings 30 over the various wheels 10 in order to provide clearance for the rocking movements of the wheels and axles.

The foregoing construction obviously allows the trucks to move relative to each other and also permits the front and rear wheels to rock in vertical planes relative to each other. As a result the wheels may accommodate themselves to any irregularities in the road surface while maintaining substantially even load distribution over a wide area of road surface.

Attention is directed to the fact that the wheel axles 12—13 and the axes 19 and 24 upon which the bolster and axles oscillate are all normally disposed in the same horizontal plane. This arrangement is of importance for several reasons, chief of which is the resulting even distribution of axle loads, and the reduction in space required for the oscillatory movements of the axles so that the overall width of the trailer may be kept within the maximum prescribed by law. Another advantage lies in the ease with which brakes may be installed upon the various wheels. I am aware that oscillating truck assemblies have been used heretofore but all such have distributed the various pivotal axes in different relative horizontal planes contrary to my arrangement as herein disclosed.

Another and important feature of my construction to which attention is directed is the wide bearing provided at the sides of the bolster by the flanges 17 which act to free the bolt 19 of sidewise stresses and maintain perfect alignment of the bolster against such sidewise or steering stresses of the wheels. This action insures that the trailer will travel straight and not take up more road space than its actual width.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a frame including a longitudinal beam, a U-shaped member rigidly secured beneath the beam and having longitudinally extending and vertically depending flanges, a bolster member mounted between the flanges and engaged laterally thereby, the said U-shaped members engaging the sides of the bolster member over the greater portion of their length and substantially from top to bottom thereof, a transverse pivot bolt extended through the flanges and bolster and supporting the bolster for vertical oscillating movement beneath the beam, and ground engaging wheels connected to the bolster.

2. In a vehicle, a tubular bolster member longitudinally extended and connected to the vehicle on a transverse pivot connection, front and rear wheel axles extended transversely with respect to the bolster, bearing members connected to the bolster and axles and forming longitudinal pivot connections for the axles, the said bearing members being removably mounted in the open ends of the tubular bolster member, and ground engaging wheels on the ends of the front and rear axles.

3. In a vehicle, a guide member having spaced longitudinally extending vertical side members rigidly mounted with respect to the vehicle, a bolster mounted between the side members and extended at its ends therefrom, a transversely axised pivot connection between the bolster and side members and supporting the said bolster for oscillating movement in guiding engagement with the side members, transversely extending wheel axles pivoted to the ends of the bolster for movement with respect thereto about axes transversely to the longitudinal axes of the axle, wheels rotatably mounted at the ends of the axles, and all of the pivot axes and the axes of rotation of the wheels being arranged to normally stand in the same horizontal plane.

4. In a vehicle, a guide member having spaced longitudinally extending vertical side members rigidly mounted with respect to the vehicle, a bolster mounted between the side members and extended at its ends therefrom but laterally embraced by said members substantially from top to bottom, a transversely axised pivot connection between the bolster and side members and supporting the said bolster for oscillating movement in guiding engagement with the side members, transversely extended wheel borne axles arranged at front and rear ends of the bolster, and removable bearing means mounted within the ends of the bolster and supporting the axles for oscillating movements about axes substantially parallel with the line of travel of the vehicle.

5. A vehicle supporting means, comprising a guide having spaced longitudinally extending and vertically disposed side members, a bolster of multilateral cross section mounted between the side members and having opposed parallel sides for guiding engagement with the said members, means operatively supporting the bolster within the side members, the said side members enclosing substantially the entire vertical side areas of the bolster but exposing the ends thereof, and wheel mounting and supporting means at the exposed ends of the bolster.

6. A vehicle supporting device comprising a guide member having parallel longitudinally extending sides, a bolster member having parallel opposite sides adapted to fit between the sides of the guide member, means for oscillatably mounting the bolster at its center portion within the sides of the guide member for up and down movements at its ends with respect to said member, the said sides of the guide member enclosing and engaging the sides of the bolster member over substantially all of their area but leaving the ends thereof exposed, and ground wheels supportably connected to the exposed ends of the bolster member.

ROY C. TOWNSEND.